United States Patent [19]

Oaks

[11] Patent Number: 4,867,995

[45] Date of Patent: Sep. 19, 1989

[54] ROLLED POUCH COOKING METHOD

[75] Inventor: Douglas W. Oaks, Shoreview, Minn.

[73] Assignee: Lloyd's Food Products, Inc., Mendota Heights, Minn.

[21] Appl. No.: 129,051

[22] Filed: Dec. 7, 1987

[51] Int. Cl.$^4$ .............................................. A23L 3/10
[52] U.S. Cl. ................................... 426/234; 426/107; 426/113; 426/243; 426/412
[58] Field of Search ............... 426/234, 243, 410, 107, 426/113, 118, 412; 229/87 F; 206/805, 389, 410; 219/10.55 E, 10.55 M

[56] References Cited

U.S. PATENT DOCUMENTS

| 2,726,156 | 12/1955 | Armstrong | 426/410 |
| 2,745,753 | 5/1956 | Ayres | 426/410 |
| 3,741,778 | 6/1973 | Rowe | 426/107 |
| 4,251,553 | 2/1981 | Kobayashi | 229/87 F |
| 4,390,554 | 6/1983 | Levinson | 219/10.55 M |

Primary Examiner—George Yeung
Attorney, Agent, or Firm—Merchant, Gould, Smith, Edell, Welter & Schmidt

[57] ABSTRACT

A rolled pouch cooking package (10) and cooking method are disclosed. The cooking package (11) includes a flexible pouch which completely encloses a food item to be heated. The pouch (10) and food item (12) are capable of being bent between a flat configuration and a rolled or coiled configuration. The cooking package (11) also includes an elastic band (18) or other retaining means which holds the pouch (11) and food item (12) in the rolled configuration. The pouch (10) is preferably made of a plastic material and has at least one slit (17) at its upper end. A method for heating a food item is also described, comprising the steps of: placing the food item (12) against a horizontal surface while the food is completely enclosed in a flexible pouch (10); coiling the food item (12) and pouch (10) so as to place them in a crown shape or rolled configuration attaching retaining means (18) to the pouch (10); and heating the food item in an oven.

8 Claims, 1 Drawing Sheet

ROLLED POUCH COOKING METHOD

FIELD OF THE INVENTION

This invention relates generally to a method of cooking and more particularly to a cooking method and cooking package in which food is uniformly cooked while retained in a rolled or coiled configuration.

BACKGROUND OF THE INVENTION

Microwave ovens have become increasingly popular because of their convenience and shortened cooking times. Microwave ovens are particularly convenient and useful for reheating prepared food which has already been cooked.

Food becomes cooked in a microwave oven by being irradiated with microwaves. The microwave radiation penetrates the food and causes the molecules of the food to align themselves continually in different directions. This agitation uniformly and rapidly heats up the food.

Some food products are packaged and sold in a plastic container or film in which the food can be conveniently heated in a microwave oven. The plastic enclosure permits passage of the microwaves through the plastic, and also retains cooking liquids or sauces without spilling. Various cuts of meat, as well as vegetables, can be cooked in this manner. One example of such a food product is barbecue pork ribs.

Pork loin backribs and pork spareribs are typically marketed in a plastic film for heating in the microwave. With this conventional packaging, the ribs are intended to be positioned flat against the bottom surface of the microwave oven during the cooking process. However, the ribs are often quite long, usually being on the order of twenty inches (20"), so that the ribs are too large for the cavity of many microwave ovens.

Even if the microwave oven is large enough, this method results in overheating of the outside edges of the ribs in order to fully cook the middle portion, because the microwave oven heats from the outside to the center. As a result, the pork ribs are not heated uniformly. This is a particular problem with barbecue pork ribs because of their density and irregular thicknesses.

To avoid these problems, the consumer must cut up the ribs into smaller portions and heat the portions separately, which is inconvenient. It can also be a messy process, because the ribs are typically packaged with a sauce or marinade which spills out when the ribs are cut into smaller portions.

The present invention addresses these and many other problems associated with currently available cooking packages and cooking methods.

SUMMARY OF THE INVENTION

The present invention comprises a rolled pouch cooking package in which a food item can be heated. The cooking package includes a flexible pouch which completely encloses the food item. The pouch and food item are capable of being bent between a flat configuration and a rolled or coiled configuration. The cooking package also includes retaining means which hold the pouch and food item in the rolled configuration. In the preferred embodiment, the pouch is made of a plastic material and has at least one slit at its upper end. The retaining means, in the preferred embodiment, is a removable elastic band which can be extended around the circumference of the pouch and food item to hold them in the rolled configuration during the cooking process.

Another aspect of the invention is a method for heating a food item, comprising the steps of: placing the food item, which is completely enclosed in a flexible pouch, flat against a horizontal surface; coiling the food item and pouch so as to place them in a crown shape or rolled configuration; and heating the food item in an oven. When in the rolled configuration, the pouch and food item are held in the crown shape by a retaining means and placed in the oven "on end" so that the longitudinal edge of the food item rests upon the horizontal surface of the oven.

A particular advantage of the cooking method and package of the present invention is that all parts of the food are uniformly heated. That is, the inner portion of the food becomes fully cooked without burning of the outer edges. This uniform heating occurs because all of the food is located in or very near the center of the microwave oven. Further, the meat or other food within the pouch becomes very tender due to the rising steam from the sauce, with excess steam exiting through the upper slits.

Another advantage of the present invention is that the food can be both packaged and heated within the same pouch. This provides added convenience for the consumer and eliminates the necessity of cutting the food and pouring the sauce or marinade over the food before or after cooking. Thus, the cooking method of the present invention is convenient and time-saving.

Besides reducing preparation time, the method and package of the present invention also reduces cooking time. The compressed shape of the meat or other food being heated allows a higher heat setting to be utilized. Also, the present invention maximizes the exposed surface area of the food which is exposed to the microwaves.

Another feature of the present invention is that the rolled food product and package of the present invention can be easily fit into almost any size microwave oven. The consumer need not cut the food or meat into smaller portions in order to accommodate the cavity of the microwave oven.

For a better understanding of the invention, and of the advantages obtained by its use, reference should be had to the drawings and accompanying descriptive matter in which there is illustrated and described a preferred embodiment of the present invention.

BRIEF DESCRIPTION OF THE DRAWINGS

Referring particularly to the drawings, wherein like reference numerals indicate like parts throughout the views:

FIG. 1 is a plan view of the cooking pouch of the present invention in its flat configuration; and .

DETAILED DESCRIPTION OF THE PREFERRED EMBODIMENT

Figure 1:
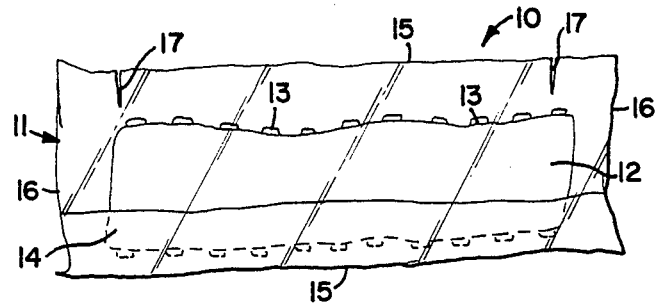

The rolled pouch cooking package of the present invention is shown generally at 10. The cooking package 10 includes a flexible film or pouch 11 which completely encloses the food item 12. The pouch 11 is sized and configured to accommodate the food item 12, with the pouch 11 preferably being a few inches longer and wider than the food 12. The excess size of the film or pouch 11, relative to the food 12, allows room for cooking steam and facilitates uniform heating and tenderizing of the food 12.

Any flexible, microwaveable material which is able to seal liquid could be used for the film or pouch 11, but the pouch 11 is preferably made of a plastic material. The preferred materials for the film or pouch 11 are (1) equal parts of nylon and poly; or (2) two parts of nylon, one part saran and one part syrlin. While the present invention contemplates heating of the food 12 in a microwave oven, a conventional oven could also be used if the pouch 11 is made of a material sufficient to withstand the heat of a conventional oven without melting or other damage to the package.

The food item 12 is shown in the drawings to be a cut of meat, specifically pork loin backribs or pork spareribs. The meat 12 may have a plurality of bones 13, and the meat 12 is approximately one-half inch (½") thick. However, the cooking package and method of the present invention are not to be limited to this type of food. Rather, the cooking package and method of the present invention could be used with any food product of sufficient length and thickness to enable rolling of the food product and pouch as described below. In the preferred embodiment, the thickness of the meat or other type of food is less than two inches (2").

In the preferred embodiment, the pouch 11 is substantially rectangular in shape as shown in FIG. 1, having two parallel longitudinal edges 15 and two parallel transverse edges 16. When the cooking package 10 is utilized for heating standard cuts of pork loin backribs or pork spareribs, the preferred size of the pouch package 10 is approximately eighteen inches (18") in length, approximately five inches (5") in width and approximately one-half inch (½") in thickness.

The pouch 11 also encloses a sauce or marinade 14 which complements the flavor of the food item 12. The sauce 14 also provides the moisture necessary to achieve uniform heating of the food product 12. Heating of the sauce 14 produces steam, which permeates and tenderizes the meat 12. Besides tenderizing the meat 12, the trapped steam also keeps the pouch 11 from melting and excessive distortion.

The pouch 11, in the preferred embodiment, has two slits 17 along its upper longitudinal edge 15. The slits 17 allow the steam to be released from the pouch 11 during the cooking process. The number and location of the slits 17 can be varied consistent with the teachings of this invention. The slits 17 should not be cut so deep that the sauce 14 is able to bubble out of the slits 17 when heated. The slits should be small enough to prevent the meat 12 from drying out, but should also be large enough to allow excess steam to be vented. In the preferred embodiment, there are two slits along the upper edge of the pouch 11, each slit being approximately one inch (1") in length.

In the preferred embodiment, there is provided a separate plastic overwrap (not shown) which encloses the pouch 11 for additional protection of the product. The overwrap, which is removed before the cooking of the food 12, is preferably a shrink film.

Figure 2:
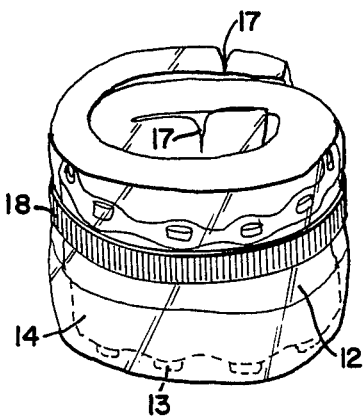
FIG. 2 is a perspective view of the microwaveable food product in its rolled configuration.

According to the method of the present invention, the pouch 11 and food item 12 are rolled so as to form a rolled or coiled configuration, as illustrated in FIG. 2. The pouch 11 is rolled in a longitudinal direction, parallel to the longitudinal edges 15. The pouch 11 and meat 12 are then positioned to be "on end" and placed within the oven (not shown) so that the bottom longitudinal edge 15 rests upon the horizontal surface of the oven.

The diameter of the meat 12 in the coiled configuration is such that it is stable in this "standing" position. In the preferred embodiment, no support is needed to maintain the pouch 11 and meat 12 in the standing configuration shown in FIG. 2.

In the preferred embodiment, with the size of the ribs 12 described above, the food product 12 is continuously coiled into a crown shape so as to form approximately two complete rings. The food 12 is coiled to be rather tight and compressed. The amount of coiling would depend upon the length and thickness of the food item to be heated.

The rolled configuration of the food product 12 and pouch 11 is then secured by retaining means such as clips, adhesive, etc. In the preferred embodiment, the retaining means is an elastic band 18, which is positioned around the circumference of the rolled food product 12. The elastic band 18 maintains the food product 12 in the coiled configuration while allowing for uniform heating of the food. Alternatively, the meat 12 could be packaged and marketed in the crown shape shown in FIG. 2, so that the consumer need only remove the protective overwrap (not shown) before placing the food in the oven. When in the rolled configuration, the meat 12 is only approximately six inches (6") in height and approximately nine inches (9") in diameter. This allows the food product to be cooked in even a relatively small microwave oven.

In the preferred embodiment, the barbecue ribs 12 have been precooked slowly to enhance their flavor. However, the meat or other food 12 could be fully cooked with the package 10 and method of the present invention, rather than merely being reheated.

The rolled configuration provides for uniform heating of the food 12, because of even distribution of the microwaves around the perimeter of the meat 12. Further, heating of the food 12 is quicker because the compressed configuration allows the consumer to use a higher power setting on the oven.

If a cut of meat is being heated which has a brisket side, such as pork spareribs, the brisket side should be at the upper end when placed in the microwave oven. This allows the fatty part to be exposed to more intense heat, which liquefies the fat and allows it to drip down on the meat 12.

In operation, the food product 12 and pouch 11 are rolled in the longitudinal direction and placed in a standing position, as illustrated in FIG. 2. The consumer uses kitchen scissors or a knife to make the slits 17. The retaining means or elastic band 18 is attached, and the food product is placed in the microwave oven in the standing position shown in FIG. 2. After cooking, the elastic band 18 is removed and the food product or meat 12 is unrolled. The flat package is placed upon a kitchen countertop or other clean surface, and one transverse edge 16 of the package 11 is cut off with scissors or a knife. With tongs or a fork, the food 12 is lifted from the bag 11, while the bag 11 is held up to retain the sauce 14 therewithin. The food can then be cut into portion sizes and served. If desired, the sauce 14 can be removed from the bag by squeezing it into a serving dish or directly over the food 12.

It is to be understood that numerous and various modifications can be readily devised in accordance with the principles of the present invention by those skilled in the art without departing from the spirit and scope of the invention. Therefore, it is not desired to restrict the invention to the particular constructions illustrated and described but to cover all modifications that may fall within the scope of the appended claims.

What is claimed is:

1. A method for heating a food item, comprising the steps of:
   (a) placing said food item in a flat configuration against a surface, said food item being completely enclosed in a flexible pouch;
   (b) coiling said food item and pouch so as to place them in a rolled configuration; and
   (c) heating said food item by microwave energy while in said rolled configuration so that said food item is uniformly heated.

2. The method according to claim 1, further comprising the step of securing said pouch with retaining means so as to maintain it in said rolled configuration.

3. The method according to claim 2, wherein said securing step comprises placing an elastic band around a circumference of said pouch when in said rolled configuration.

4. The method of claim 2, wherein said food item and pouch are placed in a microwave oven so that a longitudinal edge of said food item rests upon a bottom surface of said oven.

5. The method of claim 1, further comprising the step of cutting at least one slit in said pouch before said heating step.

6. A method for heating a food item, comprising the steps of:
   (a) placing said food item in a flat configuration against a surface, said food item being completely enclosed in a flexible pouch;
   (b) coiling said food item and pouch so as to place them in a rolled configuration; and
   (c) securing said pouch with retaining means so as to maintain it in said rolled configuration;
   (d) placing said food item and pouch in a microwave oven; and
   (e) heating said food item in said microwave oven while in said rolled configuration so that said food item is uniformly heated.

7. The method according to claim 6, wherein said securing step comprises placing an elastic band around a circumference of said pouch when in said rolled configuration.

8. The method of claim 6, further comprising the step of cutting at least one slit in said pouch before said heating step.

* * * * *